April 30, 1946.　　　C. V. AUGUSTINE　　　2,399,312
COUPLING SLEEVE PULLER
Filed April 16, 1945　　　2 Sheets-Sheet 1
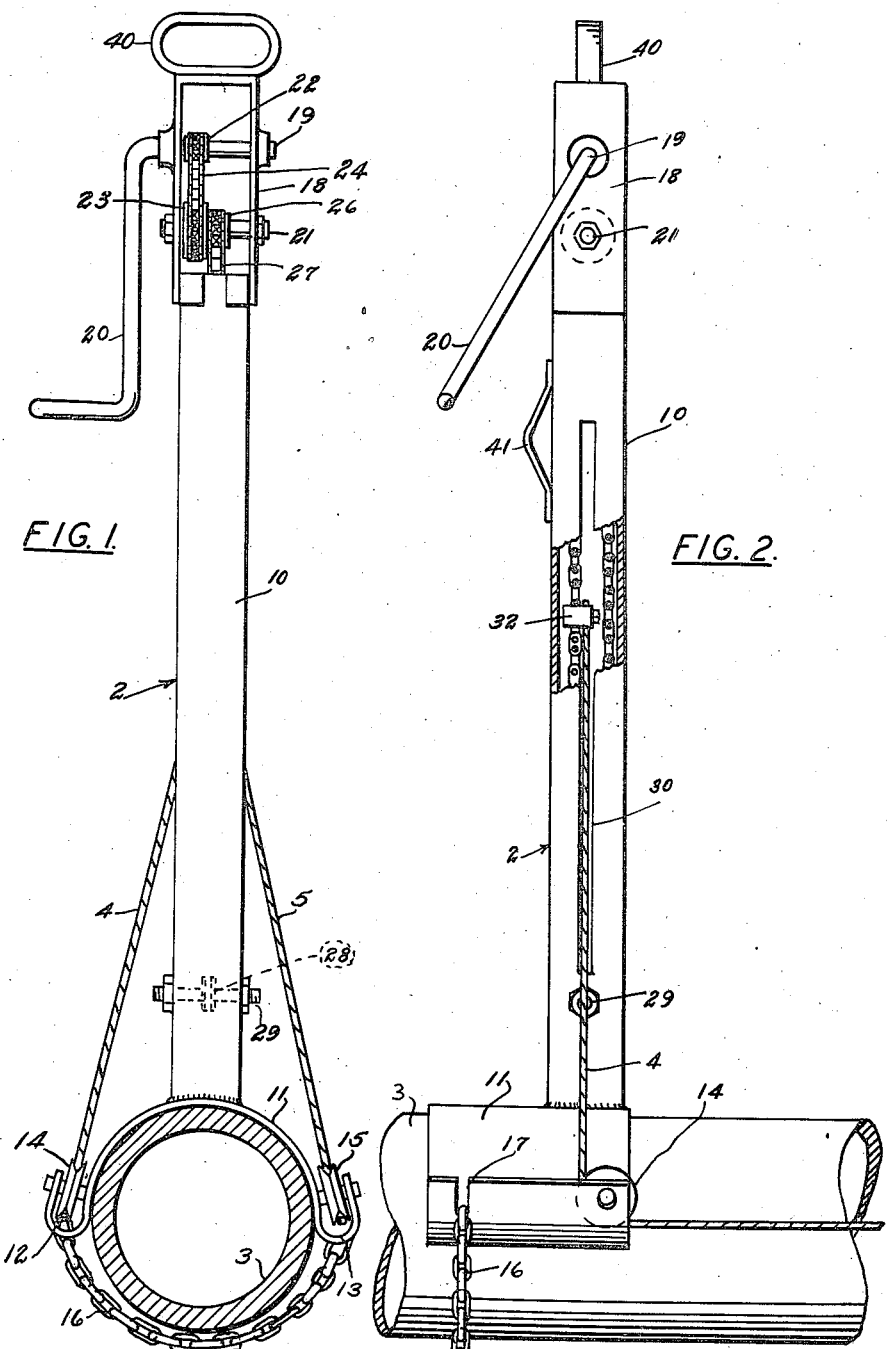
INVENTOR
Cecil V. Augustine April 30, 1946.   C. V. AUGUSTINE   2,399,312
COUPLING SLEEVE PULLER
Filed April 16, 1945   2 Sheets-Sheet 2

INVENTOR
Cecil V. Augustine

Patented Apr. 30, 1946

2,399,312

UNITED STATES PATENT OFFICE 2,399,312

COUPLING SLEEVE PULLER

Cecil V. Augustine, Maricopa County, Ariz.

Application April 16, 1945, Serial No. 588,659

3 Claims. (Cl. 254—1)

This invention pertains to coupling sleeve pullers for use on "Transite" pipe, or the like.

Heretofore, many devices have been used and proposed for pulling coupling sleeves, used for joining lengths of Transite pipe, over the joint between two lengths of pipe, or conversely, for pulling the sleeve from the joint when desired. To those familiar with the art, it is known that while a great deal of pulling stress is not required (about 2000 pounds) it must be steadily and evenly applied, and should be alined with the axis of the pipe. In practice, the sleeve is run over the end of the pipe already laid, with a rubber compression ring in place. The pipe to be joined is then positioned with its adjacent end abutting the laid pipe and with its sealing ring in place. The coupling sleeve must then be forced over this second sealing ring and roll both rings in compressed condition to the proper position midway over the joint.

This type of pipe is largely used for water mains and is, therefore, nearly always laid in the bottom of a trench, prepared to receive it, several feet beneath the surface of the earth. Devices heretofore used for joining lengths of this pipe, as aforesaid, have been found to be awkward and inefficient, particularly when used in the bottom of a trench.

In view of the foregoing one of the objects of this invention is to provide a coupling sleeve puller which may be easily attached to or detached from the pipe and sleeve when these are bedded in a narrow trench.

A second object is to provide a device with manually operative parts which can be easily operated within the confines of a trench.

A third object is to provide a device of this kind having a handle operatively positioned so that a maximum of manual effort can be efficiently applied to the pulling operation while the device is positioned within the confined area of a bedding trench; and A fourth object is to provide a mechanically efficient coupling sleeve puller which is simple to operate and can be sturdily built from inexpensive materials.

Other objects will appear hereinafter.

I attain the foregoing objects by means of the devices and the construction shown in the accompanying drawings, in which—

Figure 4:
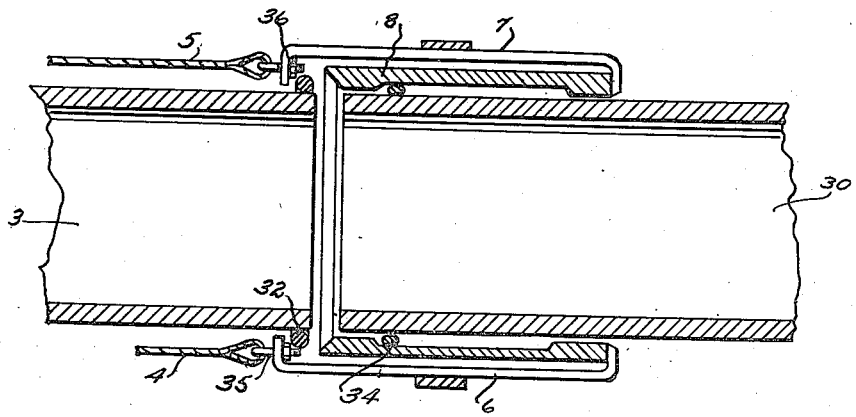
Figure 3:
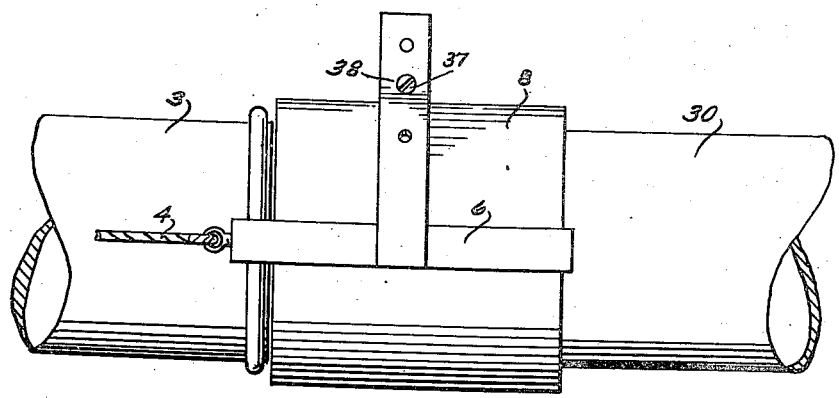

Figure 1 is an end elevation of the puller mechanism;

Figure 2, a side view thereof, with the pulling cables broken off at the edge of the sheet;

Figure 3, a side view of the sleeve coupling hooks with the pulling cables extending from the left edge of the sheet, and Figure 4 is a horizontal section thereof.

Similar numerals refer to similar parts in the several views.

The puller consists, generally, of a manually-operated pulling mechanism 2, arranged to be mounted on a length of pipe 3 and connected by cables 4 and 5 to hooks 6 and 7 adapted to engage the rim of coupling sleeve 8.

The pulling mechanism has a frame composed of a tubular metal column 10 extending upward from a semi-cylindrical saddle 11. The side edges of the saddle are bent upward to form troughs 12 and 13 on each side. Within the forward portion of these troughs are cable pulleys 14 and 15 supported on substantially radially extending bearings. Near the rear end of these troughs is a cinch chain 16 attached at one end to the outer lip of trough 12 and adapted to be fastened to the other trough lip by engaging in a notch 17. The chain passes beneath pipe 3 and this type of fastening makes it roughly adjustable to accommodate different sizes of pipe.

At the top of column 10 is a cage 18 enclosing a transverse crank shaft 19, which carries a crank 20 at one end, and beneath this a parallel driven shaft 21. Shaft 19 carries a small sprocket 22 which drives a larger sprocket 23 on shaft 21 by means of chain 24. Both of these sprockets are positioned close to the inner wall of the cage. A small second sprocket 26 is centrally positioned on driven shaft 21 and carries a chain 27 which extends down the center of column 10 and is supported at its lower end on idler sprocket 28 journaled on a transverse shaft 29 near the foot of the column.

Slots 30 are cut along the sides of the column to receive the upper ends of cables 4 and 5, which are clamped to chain 27 by dog 32.

Preferably, cables 4 and 5 may be portions of a single length of cable looped through dog 32, but are referred to here as separate cables to aid in the description.

These cables extend from the dog outward through slots 30 and downward to and around pulleys 14 and 15, and bend over these pulleys at right angles, to extend horizontally to hooks 6 and 7, which are shaped to engage the far rim of sleeve 8 and to receive the cables in a position to exert a straight line pull on the rim at the point of their attachment. Attachment is made by swivels 35 and 36.

An arched yoke 38 may be used to connect these hooks and aid in positioning them on the sleeve.

It is made adjustable by bolt 37 to position hooks in the proper mid position.

In use, the puller 2 is mounted on the pipe 3 with the column extending upward. Cinch chain 16 is looped beneath the pipe and fastened in notch 17. Sleeve hooks 6 and 7 are then set on sleeve 8, and positioned by yoke 38, and the puller held in vertical position by grasping handle 40 at the top of the cage 18. The puller is then positioned along pipe 3 so that the cables are tight when dog 32 is at the lower extremity of its travel. While grasping handle 40 in one hand the user may then rotate crank 20 with the other. The mechanical advantage of this arrangement is obvious. The differential between the size of sprockets 22 and 23 is used to increase this advantage and sufficient power to slide the coupling over the sealing rings is readily attained through crank 20. As the cables are drawn up in slots 30, the saddle is drawn toward the sleeve (and the sleeve mutually toward it). When this force is first applied, the saddle slides a short distance on pipe 3 toward the sleeve and cinch chain 16 assumes a slightly angular position. It remains in firm engagement with pipe 3 at the bottom and as the saddle slides this diagonal displacement tightens the chain and causes it to cinch up on the saddle on top of the pipe.

The sleeve 8 is then drawn from pipe 30. rolling over ring 34 until its left end contacts ring 32, on pipe 3, whereupon the sleeve rolls over ring 32 until it is drawn to the desired position midway over the abutting ends of the two pipes 3 and 30.

Obviously, the sleeve coupling can be moved in the reverse direction to effect uncoupling in the same manner as is used to couple the joint.

A carrying and positioning handle 41 may be conveniently positioned on column 10 at the point of balance.

From the foregoing, it will be seen that the whole operation of setting up and coupling can be performed from a convenient position without having to operate ratchets or levers in cramped position in a bedding trench. The device, as here illustrated, is subject to many variations and alterations in form, all of which, however, may well remain within the spirit of the invention; therefore, I wish to be limited only by the following claims.

I claim:

1. A sleeve-coupling puller comprising a pipe saddle, means for releasably attaching said saddle to a pipe, a column extending vertically therefrom, mechanism including a crank for increasing power, a cable pull operative in said column, cables attached to said mechanism and extending horizontally from said saddle, and sleeve hooks attached to the ends of said cables.

2. A coupling-sleeve puller comprising, in combination, an arched saddle adapted to fit over a pipe, a column extending perpendicularly therefrom, having longitudinal slots cut in each side, a cinch chain adapted for attachment beneath said saddle, adapted to include the circumference of a pipe and having a fixed connection to one side of said saddle and an adjustable attachment to the other side thereof; a crank operative in the upper end of said column on a shaft transverse to said saddle, a chain belt enclosed in said column, mechanism for driving said chain belt by said crank, a dog carried on one course of said chain belt, pulleys positioned on the sides of said saddle, cables extending from said chain dog through said slots and over said pulleys so as to extend in a direction parallel to the axis of a pipe on which said saddle may be placed, and hooks attached to the ends of said cables adapted to engage the rim of a coupling sleeve.

3. A coupling-sleeve puller, including in combination, an arched saddle adapted to fit over a length of pipe, means for releasably attaching said saddle to said pipe, pulleys positioned on each side thereof, a hollow column extending vertically therefrom having longitudinal slots substantially throughout the length of said column along the sides adjacent the pulleys on said saddle, a cage at the top of said column housing a transverse crank shaft, and a transverse chain belt shaft, a hand crank for driving said crank shaft carried thereby, and a holding handle on top of said cage, mechanism for driving said transverse chain shaft from said crank shaft with power increase including a small sprocket on said crank shaft, a large sprocket on said chain belt shaft and a chain operatively connecting these sprockets, mechanism for actuating a cable pull including a chain belt operative over a sprocket on said chain belt shaft and a sprocket on a transverse shaft near the bottom of said column and a dog carried on said belt chain, together with cables attached to said chain dog, extending downward through said column slots, over said saddle pulleys in a horizontal direction, and hooks adapted to evenly engage the rim of a coupling sleeve attached by swivels to the outer ends of said chain.

CECIL V. AUGUSTINE.